United States Patent

Stedman et al.

Patent Number: 6,027,088
Date of Patent: Feb. 22, 2000

[54] PLASTIC STEERING COLUMN SUPPORT MOUNTING BRACKET

[75] Inventors: Dennis F. Stedman, Ortonville; Elie M. Tohme, Royal Oak; David Shifflett, Macomb, all of Mich.

[73] Assignee: Chrysler Corporation, Auburn Hills, Mich.

[21] Appl. No.: 09/082,215

[22] Filed: May 20, 1998

[51] Int. Cl.⁷ ............................. F16M 11/00; B62D 1/16
[52] U.S. Cl. ........................ 248/200; 248/903; 280/779
[58] Field of Search ........................... 280/777, 779, 280/750; 74/492, 493; 188/371, 377; 248/200, 903

[56] References Cited

U.S. PATENT DOCUMENTS

| | | | |
|---|---|---|---|
| 1,461,210 | 7/1923 | Corley | 280/79 |
| 3,415,140 | 12/1968 | Bien et al. | 74/492 |
| 3,785,671 | 1/1974 | Salewsky | 280/87 |
| 3,934,487 | 1/1976 | Becker | 74/492 |
| 4,241,937 | 12/1980 | Eggen et al. | 280/777 |
| 4,616,522 | 10/1986 | White et al. | 74/492 |
| 4,690,432 | 9/1987 | Sakamoto et al. | 280/775 |
| 4,733,739 | 3/1988 | Lorenz et al. | 180/90 |
| 5,024,118 | 6/1991 | Khalifa et al. | 74/492 |
| 5,082,078 | 1/1992 | Umeda et al. | 180/90 |
| 5,088,571 | 2/1992 | Burry et al. | 180/90 |
| 5,180,189 | 1/1993 | Moreno | 280/779 |
| 5,228,359 | 7/1993 | Thomas | 74/492 |
| 5,259,646 | 11/1993 | Snyder | 280/777 |
| 5,265,492 | 11/1993 | Snell | 74/493 |
| 5,301,567 | 4/1994 | Snell et al. | 74/493 |
| 5,339,706 | 8/1994 | Freeman | 74/493 |
| 5,356,179 | 10/1994 | Hildebrandt et al. | 280/777 |
| 5,387,023 | 2/1995 | Denueau | 296/72 |
| 5,390,955 | 2/1995 | Kaliszewski et al. | 280/777 |
| 5,390,956 | 2/1995 | Thomas | 280/777 |
| 5,417,452 | 5/1995 | Khalifa et al. | 280/777 |
| 5,426,994 | 6/1995 | Khalia et al. | 74/493 |
| 5,452,624 | 9/1995 | Thomas et al. | 74/493 |
| 5,452,916 | 9/1995 | Beecher et al. | 280/777 |
| 5,497,675 | 3/1996 | Brown et al. | 74/492 |
| 5,498,032 | 3/1996 | Thomas | 280/777 |
| 5,509,325 | 4/1996 | Thomas | 74/493 |
| 5,538,282 | 7/1996 | White et al. | 280/779 |
| 5,564,515 | 10/1996 | Schambre | 180/90 |
| 5,564,769 | 10/1996 | Deneau et al. | 296/72 |
| 5,566,585 | 10/1996 | Snell et al. | 74/493 |
| 5,606,892 | 3/1997 | Hedderly | 74/493 |
| 5,642,792 | 7/1997 | June | 188/377 |
| 5,664,823 | 9/1997 | Misra et al. | 296/70 |
| 5,673,938 | 10/1997 | Kaliszewski | 280/777 |
| 5,676,216 | 10/1997 | Palma et al. | 180/90 |

OTHER PUBLICATIONS

Sub–Assembly Steering Column–Brake Pedal–Electrical Box & Brake SW Brackets, Publication Date Dec. 21, 1996.
Assemble Brake and Steering Column Bracket Sub Assembly to Vehicle, Publication Date Dec. 21, 1996.
Secure Steering Column Support Bracket with Four Nuts, Publication Date Feb. 27, 1997.

*Primary Examiner*—Brian L. Johnson
*Assistant Examiner*—Faye M. Fleming
*Attorney, Agent, or Firm*—Lawrence J. Shurupoff

[57] ABSTRACT

A steering column support bracket includes a molded plastic frame having a pair of laterally spaced apart side braces, a front brace interconnecting the front ends of the side braces, and an intermediate brace located between the front and rear ends of the side braces. An X-shaped truss has legs extending diagonally between the side braces and between the intermediate brace and the rear ends of the side braces.

10 Claims, 3 Drawing Sheets

PLASTIC STEERING COLUMN SUPPORT MOUNTING BRACKET

FIELD OF THE INVENTION

This invention relates generally to steering column support structures and more particularly to a plastic steering column support mounting bracket.

BACKGROUND AND SUMMARY OF THE INVENTION

When a vehicle is involved in a frontal impact, the steering column tends to rise. In other words, the steering column, which normally is inclined upwardly and rearwardly at a predetermined angle, will rise to a greater angle upon frontal impact. This is caused by the vehicle engine being thrust rearwardly.

The rise in the steering column places the steering wheel/ air bag assembly in an unfavorable position relative to the driver's chest. When the driver's chest comes into contact with the steering wheel/air bag assembly, the force against this assembly has a considerable off-axis bending component which is increased due to the rise in the steering column. If the rise in the steering column is such that the off-axis component of force on the steering wheel/air bag assembly acts above the center of mass of the driver's chest, then the driver tends to move under the steering wheel, creating an even less favorable situation.

In accordance with the present invention, support structure is provided to insure that there is no appreciable upward rise or tilt of the steering column upon frontal impact. Preferably the steering column support structure includes a bracket in the form of a molded plastic frame having a pair of side braces interconnected by a transverse front brace and a transverse intermediate brace. An X-shaped truss has first and second legs extending diagonally between the side braces between the intermediate brace and the rear ends of the side braces.

Each side brace includes one and preferably two side trusses located between the intermediate brace and the rear ends of the side braces, and a third side truss between the intermediate brace and the front brace. Preferably a pair of mounting ears projects from the side braces for mounting purposes. A plurality of metal fastener inserts may also be molded into the frame for attachment purposes.

The bracket of this invention also provides the necessary rigidity to prevent undesirable vibration of the steering column during normal operation of the vehicle.

One object of this invention is to provide a steering column support structure having the foregoing features and capabilities.

Another object is to provide a steering column support structure which is composed of a bracket in the form of a relatively inexpensive molded plastic frame that is strong and durable and well adapted to the accomplishment of its intended function.

Other objects, features and advantages of the invention will become more apparent as the following description proceeds, especially when considered with the accompanying drawings.

DETAILED DESCRIPTION OF THE PREFERRED EMBODIMENT

Figure 1:
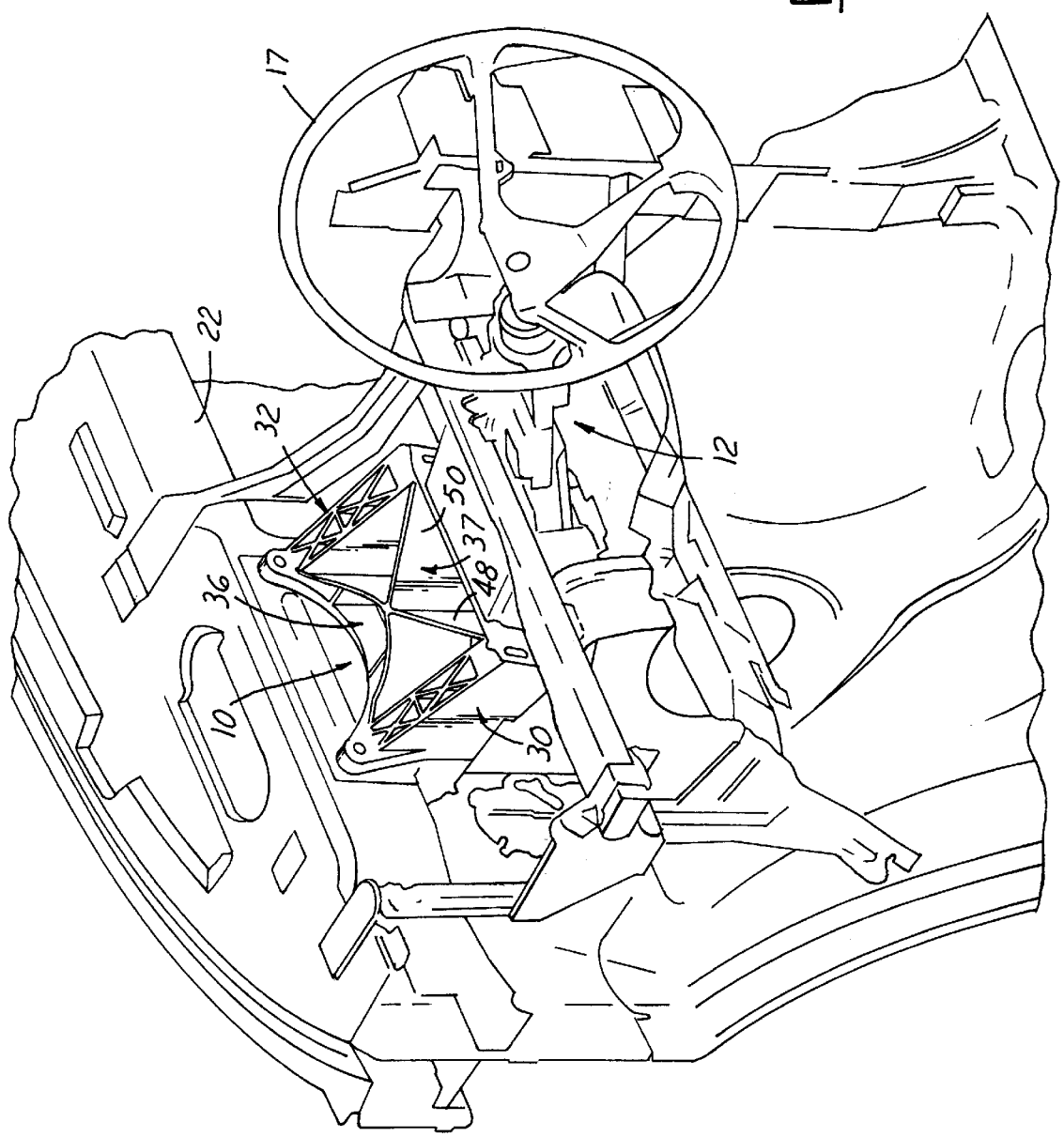
FIG. 1 is a fragmentary perspective view showing the support bracket of this invention in association with the steering column of an automotive vehicle.
Figure 4:
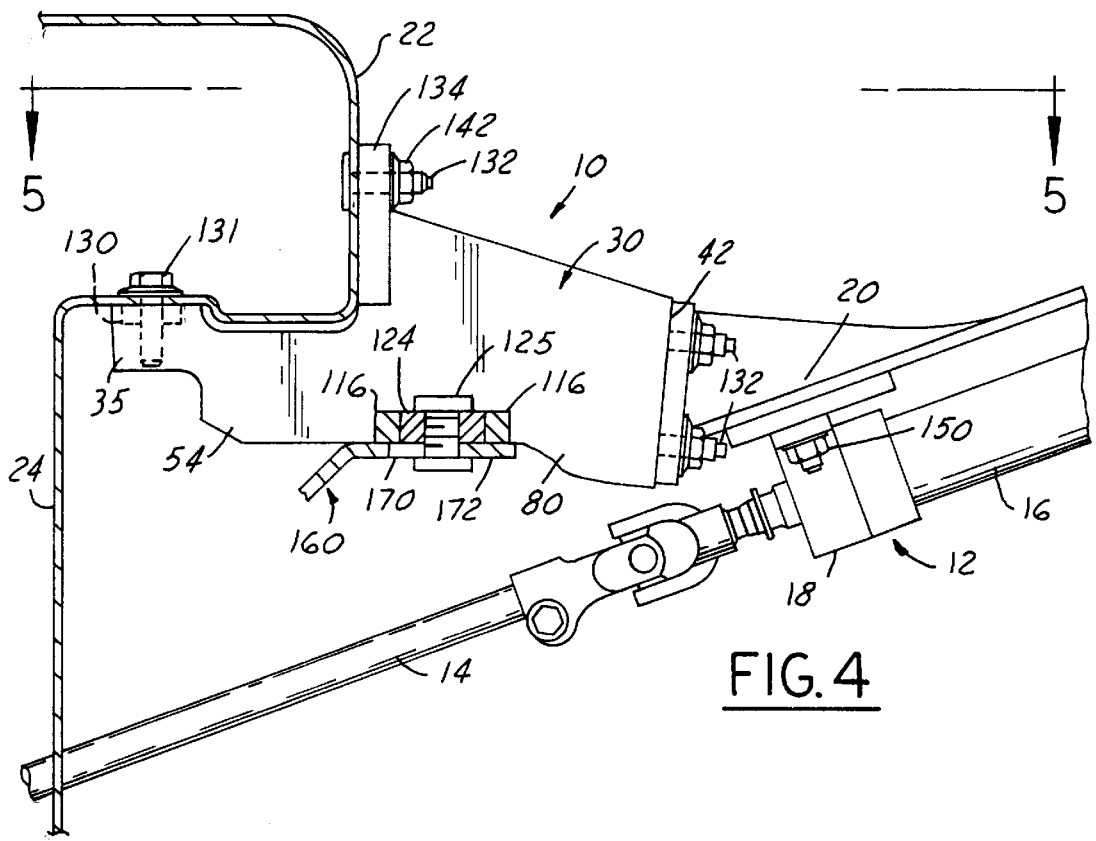
FIG. 4 is a fragmentary side view with parts in section and parts in elevation, showing the attachment of the mounting bracket to the steering column and to the instrument panel.

Referring now more particularly to the drawings, the bracket 10 rigidly secures the steering column 12 against vibration during normal vehicle operation and also prevents the steering column, in a frontal impact, from rising up from the illustrated position (FIGS. 1 and 4). The steering column 12, as illustrated, is inclined upwardly and rearwardly at a predetermined angle and includes a steering shaft 14 extending lengthwise within a tubular jacket 16. A steering wheel 17 is mounted on the upper end of the steering shaft 14. A collar 18 on the steering column jacket 16 is secured to the instrument panel 20, and the bracket 10 is secured to the instrument panel 20 and to the cowl plenum 22 of the upper dash panel 24, all as more fully described hereinafter.

The bracket 10 includes a molded frame made of a suitable plastic material, preferably nylon reinforced with glass fibers. The frame has laterally spaced apart side braces 30 and 32, a transverse front brace 34, a transverse intermediate brace 36, and an X-shaped truss 37 (FIGS. 1–3 and 5).

The side braces 30 and 32 are preferably in the form of horizontally elongated, vertically disposed panels that flare apart slightly in a rearward direction. The front brace 34 is in the form of a bar that extends horizontally and has its opposite ends integrally molded to the terminal portions 35 at the front ends of the respective side braces. The intermediate brace 36 is in the form of a vertical panel, the opposite ends of which are integrally molded to the side braces intermediate the front ends and rear ends thereof.

The truss 37 has crossing legs 48 and 50 which extend diagonally between the side braces 30 and 32 between the intermediate brace 36 and the terminal portions 42 at the rear ends of the side braces. The ends of the leg 48 are integrally molded to the terminal portion 42 at the rear end of the side brace 30 and to the side brace 32 at approximately the point where the side brace 32 and the intermediate brace 36 are joined. The ends of the leg 50 are integrally molded to the terminal portion 42 at the rear end of the side brace 32 and to the side brace 30 at approximately the point where the side brace 30 and the intermediate brace 36 are joined. The legs 48 and 50 are molded integrally at the point of crossing.

The front end portion 54 of each side brace 30, 32 includes a rectangular box frame 56 (FIG. 5) internally supported by an X-shaped side truss 58. The box frame 54 has laterally spaced side walls 60 and 62 integrally connected at the rear to the intermediate brace 36 and at the front to the terminal portions 35 of the side brace. The X-shaped side truss 58 within each box frame 56 has crossing legs 66 and 68. The legs 66 and 68 are terminally, integrally connected to the side walls 60 and 62 of the box frame 54 at the corner points 70, 72, 74 and 76 and are integrally connected to one another at the point of crossing.

Figure 5:
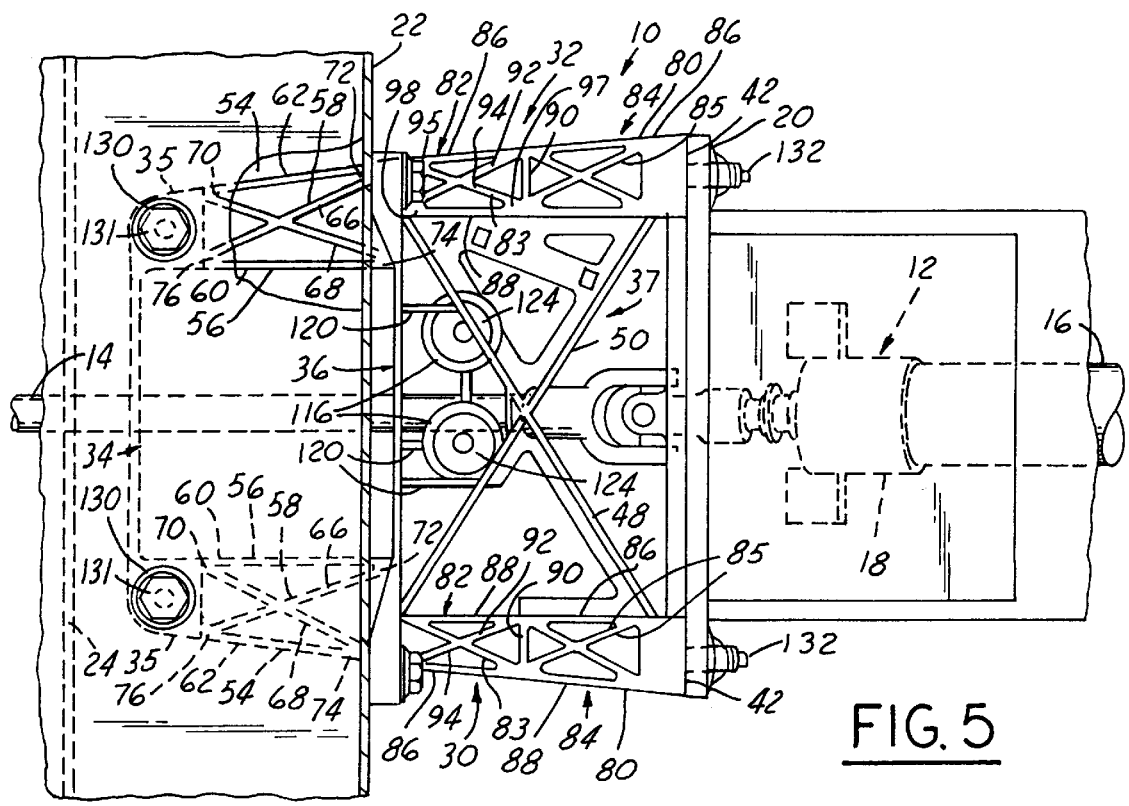
FIG. 5 is a view taken on the line 5—5 in FIG. 4.

The rear end portion 80 of each of the side braces 30 and 32 is of a substantially greater vertical dimension than the front end portions 54 thereof. Each front end portion 80 includes a front rectangular box frame 82 internally supported by an X-shaped side truss 83, and a rear rectangular box frame 84 internally supported by an X-shaped side truss 85 (FIG. 5). Each box frame 82 has laterally spaced side walls 86 and 88 integrally connected at the front to the intermediate brace 36 and at the rear to a transverse wall 90 separating the front and rear box frames 82 and 84 in the rear portion of each side brace. The X-shaped side truss 83 within each box frame 82 has crossing legs 92 and 94. The legs 92 and 94 are terminally, integrally connected to the side walls 86 and 88 of the box frame 82 at the corner points 95, 96, 97 and 98 and are integrally connected to one another at the point of crossing. The box frame 84 of each side wall has laterally spaced side walls which are continuations or extensions of the side walls 86 and 88 of the box frame 82. The side wall extensions connect at the rear into the terminal portion 42 of each side frame 36. The X-shaped side truss 85 within each box frame 84 has crossing legs similar to those of the side trusses 83, which are terminally, integrally connected to the side wall extensions at the four corner points as was the case with the legs of trusses 83 and integrally connected to one another at the point of crossing.

The side trusses 58, 83 and 85 provide a light weight construction which is extremely rigid and resistant to distortion, deformation and twisting.

Fastener holders 116 (FIG. 5) are molded parts of the bracket 10 connected to the legs 48 and 50 of the truss 37 and to the intermediate brace 36 and to each other by webs of plastic framing material 120. Fixedly mounted in each of these fastener holders is a vertically disposed metal fastener 124 preferably internally threaded to receive threaded bolts 125 (FIG. 4).

The front terminal portions 35 of the side braces 36 have vertically disposed metal fasteners 130 molded therein which are preferably internally threaded to receive threaded bolts 131.

The rear terminal portions 42 of the side braces 36 have the heads of horizontally disposed metal fasteners 132 molded therein with the projecting shanks thereof preferably threaded. Ears 134 (FIGS. 2 and 3) project upwardly and outwardly from the opposite side edge portions of the intermediate brace 36. The ears 134 may also be considered portions of the side braces 36 because they are integrally molded as parts thereof as can be seen in the drawings. Holes 140 in the ears are for receiving bolts 142.

The bolts 131 and 142 rigidly secure the bracket 10 to the cowl plenum 22 of the upper dash panel 24. The fasteners 132 secure the rear end portion of the bracket to the instrument panel 20. Additional fasteners 150 are provided to secure the collar 18 on the steering column to the instrument panel. Hence, the steering column 12 is rigidly secured to the bracket 10 by means of the fasteners 132 and 150, and the bracket 10 is rigidly secured to the dash panel 24.

Figure 3:
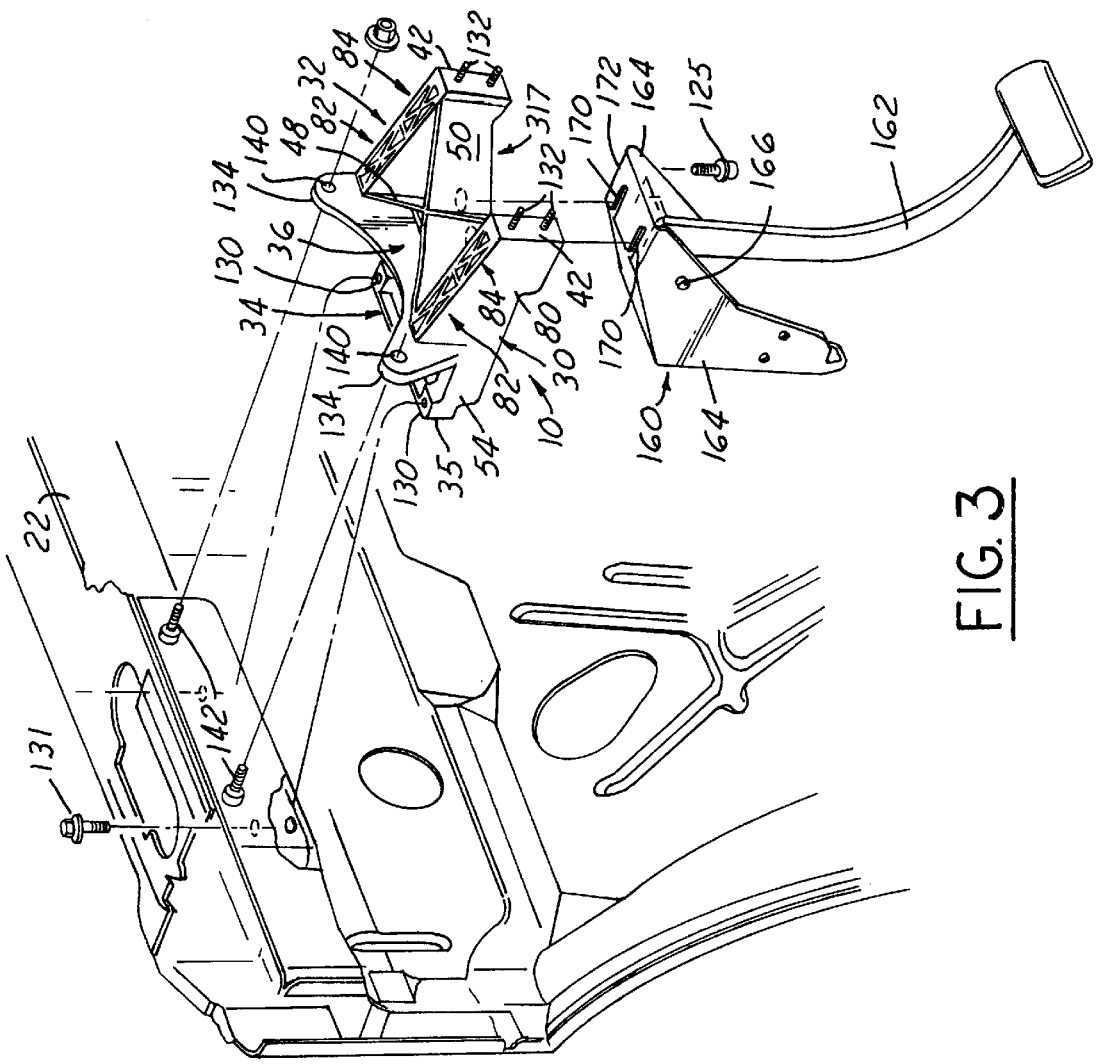
FIG. 3 is an exploded perspective view of the parts of the structure shown in FIG. 2.
Figure 2:
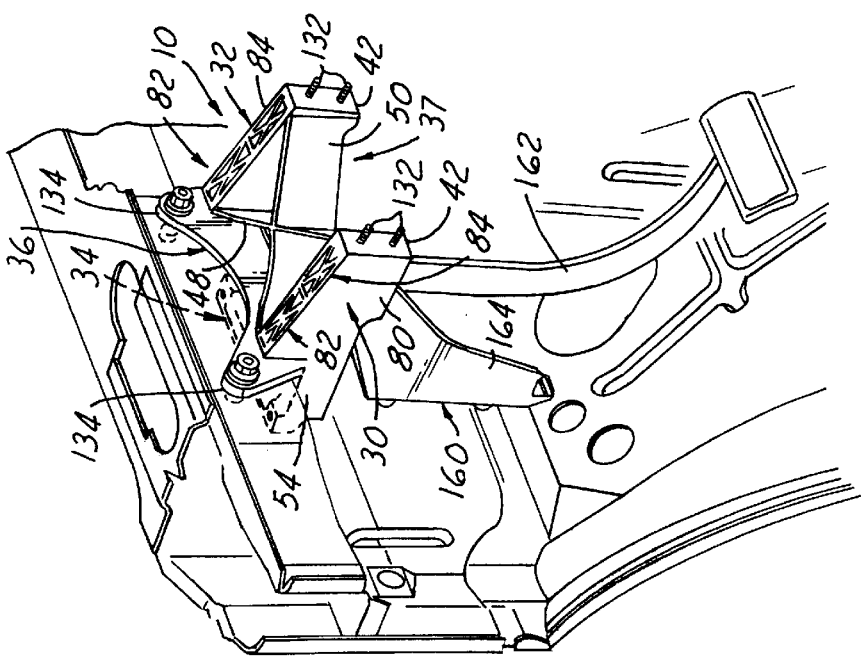
FIG. 2 is a fragmentary perspective view with the steering column removed to more clearly illustrate the support bracket.

The bolts 125 are provided for connecting the bracket 10 to the bracket 160 which mounts the brake pedal 162. As shown in FIGS. 2–4, the bracket 160 has laterally spaced side walls 164 supporting a transverse pin 166 on which the upper end of the brake pedal 162 is pivoted. In the event of a frontal impact, the engine may be pushed rearwardly and this tends to move the entire brake pedal assembly to the rear. To permit this, the openings 170 in the top panel 172 of the bracket 160 for the brake pedal, which receive the bolts 125, are elongated to permit the bracket 160 to move rearwardly without disturbing the mounting bracket 10 for the steering column.

We claim:

1. A steering column support bracket, comprising a molded plastic frame including a pair of laterally spaced apart side braces each having front and rear ends, a front brace interconnecting the front ends of said side braces, an intermediate brace located between the front and rear ends of said side braces and connected to said side braces, and an X-shaped truss having first and second legs extending diagonally between said side braces and between said intermediate brace and the rear ends of said side braces.

2. The bracket of claim 1, further comprising a plurality of metal fasteners molded into a rear portion of said frame.

3. The bracket of claim 1, wherein each of said side braces comprises at least one X-shaped side truss.

4. The bracket of claim 3, wherein each of said side braces has a box frame enclosing said at least one X-shaped side truss.

5. The bracket of claim 3, wherein each of said side braces comprises a pair of X-shaped side trusses located between the rear ends of said side braces and said intermediate brace.

6. The bracket of claim 5, wherein each of said side trusses further comprises a third side truss located between said intermediate brace and said front brace.

7. The bracket of claim 6, further comprising a pair of mounting ears respectively connected to said pair of side braces.

8. The bracket of claim 7, wherein said mounting ears are further connected to said intermediate brace.

9. The bracket of claim 8, further comprising a plurality of metal fasteners molded into said frame.

10. The bracket of claim 9, wherein each of said side braces has a box frame enclosing each of said X-shaped side trusses.

* * * * *